US010476585B1

(12) United States Patent
Torres et al.

(10) Patent No.: US 10,476,585 B1
(45) Date of Patent: Nov. 12, 2019

(54) DISTRIBUTED NETWORK NODE LOCATIONS IN A MOBILE NODE NETWORK

(71) Applicant: Hughes Network Systems, LLC, Germantown, MD (US)

(72) Inventors: Robert James Torres, New Market, MD (US); George Joseph Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/221,177

(22) Filed: Dec. 14, 2018

(51) Int. Cl.
*H04B 7/185* (2006.01)
*H04B 7/195* (2006.01)
*H04B 7/19* (2006.01)

(52) U.S. Cl.
CPC ..... *H04B 7/18521* (2013.01); *H04B 7/18513* (2013.01); *H04B 7/18515* (2013.01); *H04B 7/19* (2013.01); *H04B 7/195* (2013.01)

(58) Field of Classification Search
CPC ............... H04N 21/84; H04N 21/4181; H04N 21/6143; H04N 21/436; G06T 3/40; G09G 3/2092; H04B 7/18513; H04B 7/0617; H04W 4/021

USPC ............ 455/13.1, 405, 3.1; 370/320; 348/7; 379/40
See application file for complete search history.

(56) References Cited

U.S. PATENT DOCUMENTS

| 6,067,442 A * | 5/2000 | Wiedeman ......... H04B 7/18545 370/320 |
| 10,069,935 B1 * | 9/2018 | Coleman ............... H04L 67/327 |

* cited by examiner

*Primary Examiner* — Phuoc H Doan
(74) *Attorney, Agent, or Firm* — Kilpatrick Townsend & Stockton LLP

(57) ABSTRACT

Various arrangements for establishing a bidirectional satellite communication session are presented. Initialization data may be accessed to tune an antenna to a geosynchronous satellite, wherein the initialization data is stored locally by the access node. The initialization data may be used to point and tune the antenna to the geosynchronous satellite. Ephemeris data may be received from the geosynchronous satellite. The ephemeris data may be indicative of orbital locations of satellites that are part of a non-geosynchronous satellite constellation. The ephemeris data may be used to point and tune the antenna to a satellite of the non-geosynchronous satellite constellation. The bidirectional satellite communication session may then be established with the satellite of the non-geosynchronous satellite constellation.

20 Claims, 5 Drawing Sheets

DISTRIBUTED NETWORK NODE LOCATIONS IN A MOBILE NODE NETWORK

BACKGROUND

Constellations of low-earth orbit (LEO) and medium earth orbit (MEO) satellites may be used for providing various data-based services to an access node, such as user equipment (UE). Both LEO and MEO satellites may orbit the earth and may only have a line-of-sight to a portion of the earth's surface at a given time. Therefore, in order to provide continuous coverage over a geographic region, multiple LEO and/or MEO satellites are needed. Since these satellites orbit the earth, the position of LEO and MEO satellites are not fixed. UE attempting to communicate with a LEO or MEO satellite may need to determine a direction in which to point an antenna, either electronically or physically, in order to communicate with the orbiting satellite. Such a determination may be time consuming especially if the UE has been turned off or out of communication with the satellites for a significant period of time. The location determination can result in a significant amount of down-time before the UE locates and communicates with the LEO or MEO satellite.

SUMMARY

Various embodiments are described related to a method for establishing a bidirectional satellite communication session. In some embodiments, a method for establishing a bidirectional satellite communication session is described. The method may include accessing, by an access node, initialization data to tune an antenna to a geosynchronous satellite. The initialization data may be stored locally by the access node. The method may include using, by the access node, the initialization data to point and tune the antenna to the geosynchronous satellite. The method may include receiving, by the access node, ephemeris data from the geosynchronous satellite. The ephemeris data may be indicative of orbital locations of satellites that are part of a non-geosynchronous satellite constellation. The method may include using, by the access node, the ephemeris data from the geosynchronous satellite to point and tune the antenna to a satellite of the non-geosynchronous satellite constellation. The method may include establishing, by the access node, the bidirectional satellite communication session with the satellite of the non-geosynchronous satellite constellation.

Embodiments of such a method may include one or more of the following features: The method may include accessing, by the access node, a communication network via the satellite of the non-geosynchronous satellite constellation with which the bidirectional satellite communication session has been established. The method may include broadcasting, by the geosynchronous satellite, the ephemeris data on a periodic basis as multicast data. The method may include transmitting, by the access node, a request for ephemeris data to the geosynchronous satellite via the antenna that has been pointed and tuned to the geosynchronous satellite. The method may include transmitting, by the geosynchronous satellite, the ephemeris data to the access node in response to the request. The antenna of the access node may be a flat panel antenna and may be electronically pointed. The non-geosynchronous satellite constellation may be a low earth orbit (LEO) satellite constellation. The non-geosynchronous satellite constellation may be a medium earth orbit (MEO) satellite constellation. The non-geosynchronous satellite constellation may be an eccentric earth orbit satellite constellation. The non-geosynchronous satellite constellation may be a hybrid satellite constellation that includes one or more non-geosynchronous satellites in LEO and one or more non-geosynchronous satellites in MEO. The method may further include determining, by the access node, that locally-stored ephemeris data may be no longer valid. The initialization data may be accessed in response to determining that the locally-stored ephemeris may be no longer valid. Determining that the locally-stored ephemeris data may be no longer valid may include determining a time difference that has elapsed between a current time and a timestamp of the locally-stored ephemeris data. The method may include determining that the time difference exceeds an ephemeris data validity time threshold. The method may include determining, by the access node, that locally-stored ephemeris data cannot be used to successfully communicate with the non-geosynchronous satellite constellation. The initialization data may be accessed in response to determining that the locally-stored ephemeris data cannot be used to successfully communicate with the non-geosynchronous satellite constellation.

In some embodiments, a system for establishing a bidirectional satellite communication session is described. The system may include an access node. The access node may include a steerable antenna. The access node may include a network interface. The access node may include one or more processors in communication with the network interface and the steerable antenna. The one or more processors may be configured to access initialization data to tune an antenna to a geosynchronous satellite. The initialization data may be stored locally by the access node. The one or more processors may be configured to use the initialization data to point and tune the antenna to the geosynchronous satellite. The one or more processors may be configured to receive ephemeris data from the geosynchronous satellite. The ephemeris data may be indicative of orbital locations of satellites that are part of a non-geosynchronous satellite constellation. The one or more processors may be configured to use the ephemeris data from the geosynchronous satellite to point and tune the antenna to a satellite of the non-geosynchronous satellite constellation. The one or more processors may establish the bidirectional satellite communication session with the satellite of the non-geosynchronous satellite constellation.

Embodiments of such a system may include one or more of the following features: The one or more processors may be further configured to access a communication network via the satellite of the non-geosynchronous satellite constellation with which the bidirectional satellite communication session has been established. The system may further include the geosynchronous satellite that may be configured to broadcast the ephemeris data on a periodic basis as multicast data. The one or more processors may be further configured to transmit a request for ephemeris data to the geosynchronous satellite via the steerable antenna that has been pointed and tuned to the geosynchronous satellite. The system may further include the geosynchronous satellite that may be configured to transmit the ephemeris data to the access node in response to the request. The steerable antenna of the access node may be a flat panel antenna and may be electronically pointed. The system may further include the non-geosynchronous satellite constellation. The non-geosynchronous satellite constellation may be a low earth orbit (LEO) satellite constellation.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

When an access node is attempting to communicate with a LEO or MEO satellite, the access node may be able to communicate with the satellite quicker if the access node does not need to search for the satellite. Since LEO and MEO satellites are not in a geosynchronous orbit, the location of LEO and MEO satellites changes rapidly. A high-gain antenna may have a relatively narrow radiation pattern that may need to be pointed approximately directly at the satellite in order to communicate with the satellite. If the access node has no stored information or access to information that defines where the satellite is expected to be found, the access node may need to "search" the sky by pointing the antenna in various directions until communication with a desired satellite is acquired.

Performing such search can be time consuming which can impact efficiency and, in certain situations, be dangerous, such as when a communication is needed immediately in an emergency. Rather than searching, the access node may point an antenna towards a satellite that does not substantially change position. A geosynchronous satellite remains roughly in the same place. Therefore, even if an access point has not communicated with a network in a significant period of time, the access point can expect to locate the geosynchronous satellite in an approximately fixed direction.

The geosynchronous satellite may transmit ephemeris data that defines properties of a non-geosynchronous satellite constellation. Such ephemeris data can include orbital information for one or more non-geosynchronous satellites within the constellation. Using the orbital data, the access node may be able to calculate where to point its antenna from its known location on earth. By being able to determine where to point the antenna based on obtained ephemeris data, the access node may be able to establish a communication session with the non-geosynchronous satellite quicker than if searching is used.

Figure 1:
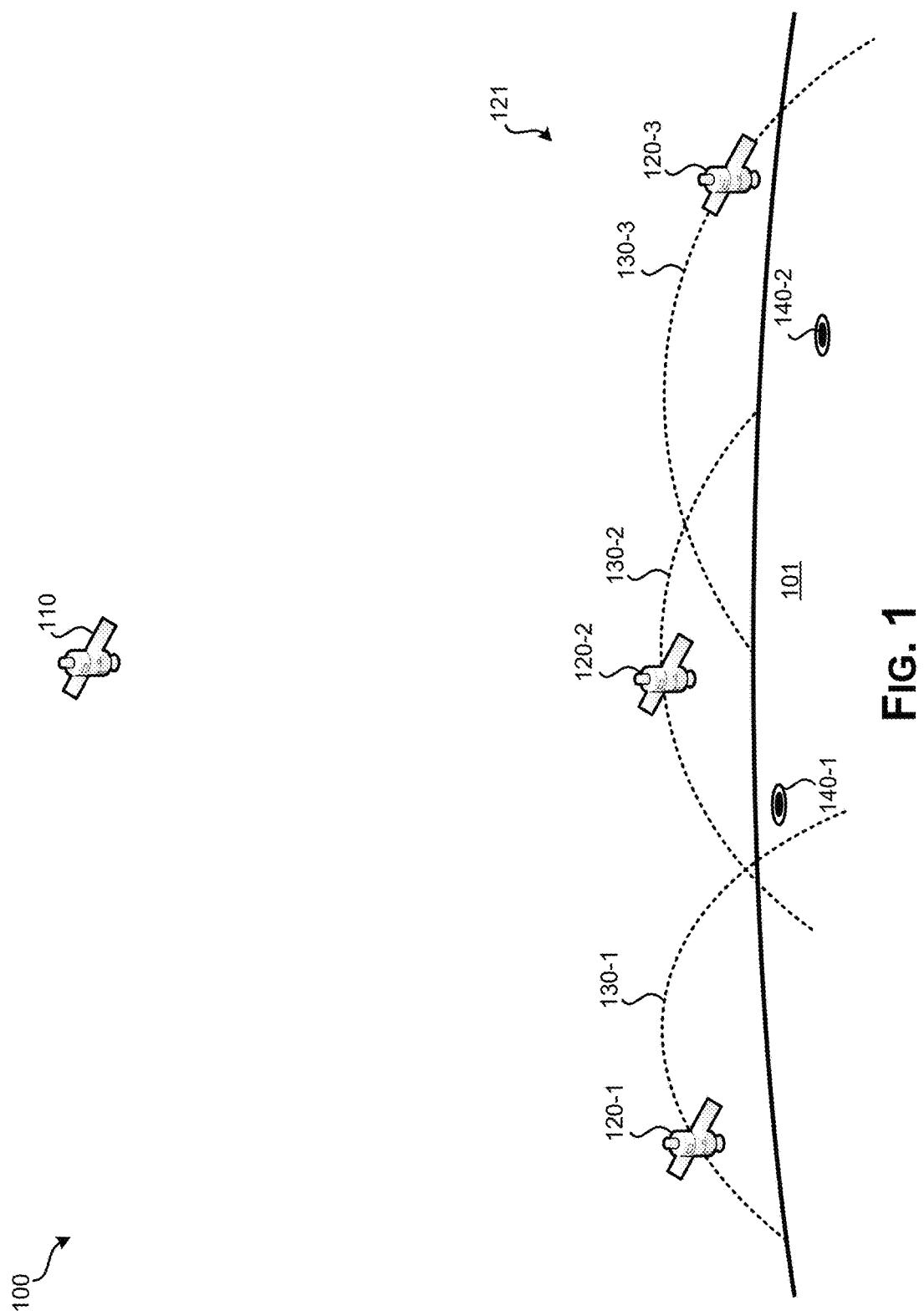
FIG. 1 illustrates an embodiment of a system that provides ephemeris data via a geosynchronous satellite for non-geosynchronous satellites.

Detail regarding such embodiments and additional embodiments is provided in relation to the figures. FIG. 1 illustrates an embodiment of a system 100 that provides ephemeris data via a geosynchronous satellite for non-geosynchronous satellites (e.g., LEO satellites and MEO satellites).

In system 100, geosynchronous satellite 110 is in geosynchronous orbit. Geosynchronous satellite 110, therefore, may remain above a fixed location approximately on the earth's equator. Satellite 110 may be approximately 35,786 km above the earth's surface 101. Satellite 110 may remain approximately in a fixed location. Geosynchronous satellites, including geosynchronous satellite 110, may drift within an orbital window, such as due to lunar gravity, solar gravity, asymmetry of the earth, solar wind, and radiation pressure. When geosynchronous satellite 110 is leaving or about to leave this orbital window, geosynchronous satellite 110 may perform orbital stationkeeping, such as by firing on-board thrusters (e.g., a Hall-effect thruster), to remain within its prescribed orbital window. From the perspective of an access point located on or near the earth's surface 101, geosynchronous satellite 110 may be treated as effectively stationary for the purposes of pointing an antenna. The size of the orbital window compared to the distance of geosynchronous satellite 110 from the earth's surface 101 is so small, the direction from a point on earth to geosynchronous satellite 110 remains effectively constant.

Non-geosynchronous satellites 120 (120-1, 120-2, 120-3) may be in LEO, MEO, or some other form of non-geosynchronous orbit (such as an elliptical orbit, which may be a polar orbit) and may form satellite constellation 121. Some satellite constellations may include satellites in multiple forms of orbit, such as MEO and LEO. For the purposes of FIG. 1, the distances between the earth's surface 101, non-geosynchronous satellites 120, and geosynchronous satellite 110 are not to scale. If in LEO, non-geosynchronous satellites 120 may orbit the earth at altitudes between 160 km and 2,000 km. If in MEO, non-geosynchronous satellites 120 may orbit the earth between 2,000 km and 35,786 km.

Non-geosynchronous satellites 120 may function as mobile nodes within a network to relay data to and from access nodes. Therefore, access nodes perform bidirectional communication with non-geosynchronous satellites 120. Each satellite of non-geosynchronous satellites 120 may communicate with a ground-based satellite gateway. Alternatively, non-geosynchronous satellites 120 may function as a mesh network in which non-geosynchronous satellites 120 may communicate with each other. In such an arrangement, a given non-geosynchronous satellite may communicate with a ground-based satellite gateway through one or more other non-geosynchronous satellites that are part of the same constellation.

Since the satellites of satellite constellation 121 are in LEO or MEO orbit, the location of non-geosynchronous satellites 120 is constantly changing with respect to access nodes located on or near the earth's surface 101. For example, non-geosynchronous satellite 120-1 may follow orbit 130-1; non-geosynchronous satellite 120-2 may follow orbit 130-2; and non-geosynchronous satellite 120-3 may follow orbit 130-3. While three satellites are illustrated as part of satellite constellation 121, it should be understood that many additional satellites that are not currently visible may be part of satellite constellation 121.

Access nodes 140 represent systems or devices that perform bidirectional communication with one or more satellites of satellite constellation 121. Access nodes can include user equipment (e.g., laptops, satellite phones, mobile computing devices, etc.), local gateway systems (e.g., network access points for a region), and mobile communication systems (e.g., network communication equipment for an airplane, ship, or other form of vehicle).

Since non-geosynchronous satellites 120 are non-geosynchronous, their position relative to the earth's surface 101 is constantly changing. For an access node to communicate with a particular satellite of non-geosynchronous satellites 120, each of access nodes 140 (e.g., 140-1, 140-2) may point its antenna in the direction of the satellite with which it is trying to communicate. The location of geosynchronous satellite 110 may remain approximately constant for long periods of time. Therefore, access nodes 140 may always expect to be able to communicate with geosynchronous satellite 110 when the antennas of access nodes 140 are pointed in a particular direction. This particular direction may remain fixed for individual access nodes, but may vary among access nodes. That is, the direction which access node 140-1 points its antenna to communicate with geosynchronous satellite 110 may be fixed and may vary from the direction which access node 140-2 points its antenna to communicate with geosynchronous satellite 110. Access nodes 140 may receive ephemeris data from geosynchronous satellite 110, which may include data about the orbits of non-geosynchronous satellites 120.

Not only may non-geosynchronous satellites 120 orbit the earth in non-geosynchronous orbits, but other conditions may lead to situations in which access nodes 140 need up-to-date information to communicate with one or more satellites of non-geosynchronous satellites 120. As a first example, at the time of installation of an access node, ephemeris data may be needed by the access node to establish communication. As a second example, a satellite of non-geosynchronous satellites 120 may be offline for a period of time, or a satellite of non-geosynchronous satellites 120 may be removed or otherwise decommissioned from satellite constellation 121. As a third example, a regulatory change, such as whether an access node has permission to access a satellite constellation from a particular territory, may necessitate new ephemeris data. Additionally or alternatively, one or more new satellites may be added to satellite constellation 121. If one of access nodes 140 has not communicated with one or more of non-geosynchronous satellites 120 in a significant period of time, access nodes 140 may not have information that defines: 1) the orbits of non-geosynchronous satellites 120; 2) where in such orbits satellites 120 may be; 3) which satellites are active and/or inactive; and 4) indications of new or removed satellites. Ephemeris data transmitted by geosynchronous satellite 110 may provide information indicative of such properties of satellite constellation 121. By access node 140 receiving this ephemeris data, locations of active satellites of satellite constellation 121 may be determined.

Figure 2:
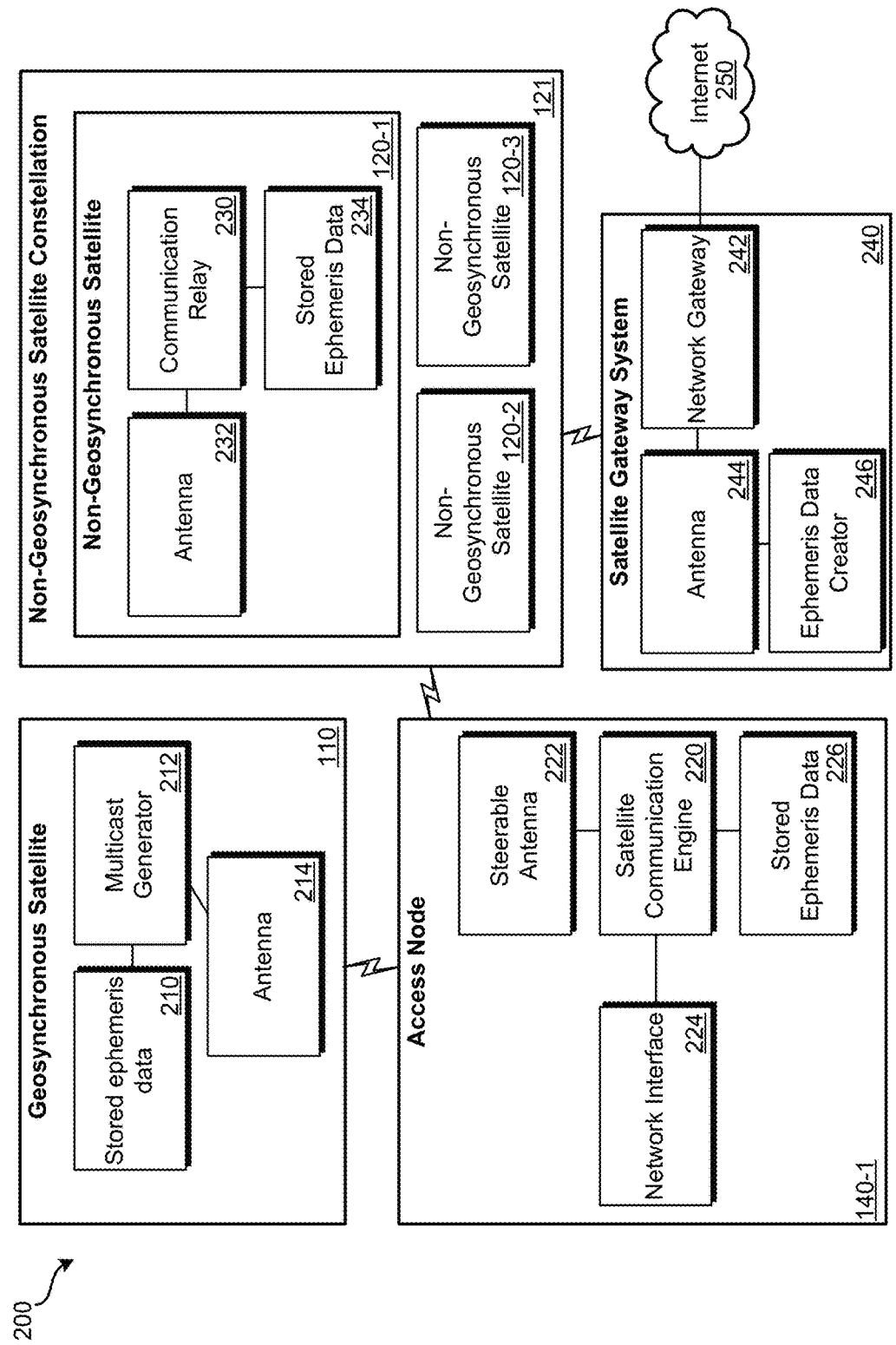
FIG. 2 illustrates a block diagram of an embodiment of a system that provides ephemeris data via a geosynchronous satellite for non-geosynchronous satellites.

FIG. 2 illustrates a block diagram of an embodiment of a system 200 that provides ephemeris data via a geosynchronous satellite for non-geosynchronous satellites. System 200 may include: geosynchronous satellite 110; non-geosynchronous satellite constellation 121; access node 140-1; satellite gateway system 240; and Internet 250. In the illustrated example of system 200, three non-geosynchronous satellites are present along with a single access node 140-1. Such reduced numbers of non-geosynchronous satellites and access nodes are for illustration purposes only; in actual implementation, tens, hundreds, or even thousands of non-geosynchronous satellites may be part of non-geosynchronous satellite constellation 121 and tens, hundreds, or thousands of access nodes may be geographically scattered.

Geosynchronous satellite 110 may include: stored ephemeris data 210; multicast generator 212; and antenna 214. Stored ephemeris data 210 may be kept up-to-date by satellite gateway system 240, which may periodically transmit up-to-date ephemeris data to geosynchronous satellite 110. The ephemeris data includes information about satellites within non-geosynchronous satellite constellation 121. In some embodiments, ephemeris data is stored, using a non-transitory processor readable medium, as stored ephemeris data 210 and repeatedly transmitted. In other embodiments, up-to-date ephemeris data is repeatedly received from satellite gateway system 240 and immediately relayed by geosynchronous satellite 110 to a large geographic region. Regardless of whether geosynchronous satellite 110 stores the ephemeris data locally or not, the ephemeris data may be transmitted periodically. Multicast generator 212 may generate a multicast message or series of multicast messages than can be received by many different access nodes. Therefore, a multicast message (or series of multicast messages) may be transmitted by geosynchronous satellite 110 to a large number of access nodes. Antenna 214 may be aimed to transmit the one or more multicast messages to a large geographic region. In some embodiments, depending on the geographic region at which antenna 214 is to be aimed, the ephemeris data may be altered to include only information that is needed by access points located in the geographic region at which antenna 214 is aimed. For instance, if a particular non-geosynchronous satellite of satellite constellation 121 will never come near a particular geographic region, information about that satellite may be excluded from the ephemeris data transmitted as part of the multicast message to access points in the geographic region. An additional optimization may be performed on the basis of geosynchronous satellite 110's spot beam pattern. For example, geosynchronous satellite 110 may generate multiple downlink beams and in each beam different ephemeris may be multicast to nodes present within the spot beams.

In other embodiments, rather than geosynchronous satellite 110 periodically or occasionally transmitting multicast ephemeris data, ephemeris data may be transmitted in response to a request received by geosynchronous satellite 110 from an access node. For example, access node 140-1 may transmit a request for ephemeris data to geosynchronous satellite 110. In response, geosynchronous satellite 110 may transmit stored ephemeris data or the request may be relayed by geosynchronous satellite 110 to satellite gateway system 240, which may respond to access node 140-1 with a response message relayed via geosynchronous satellite 110.

In some embodiments, the ephemeris data provided in response to a request from access node 140-1 may be a predefined set of ephemeris data that is sent in response to all such requests from access nodes, regardless of where access node 140-1 is geographically located. In other embodiments, the request may include an indication of a geographic location of access node 140-1. Based on the geographic location, geosynchronous satellite 110 or satellite gateway system 240 may send customized ephemeris data that only includes information about satellites within satellite constellation 121 that is relevant to the geographic region in which access node 140-1 is located. For instance, information about a non-geosynchronous satellite that never approaches the location of access node 140-1 within a threshold distance may not be provided to access node 140-1.

Access node 140-1, which is representative of many access nodes 140, may use non-geosynchronous satellite constellation 121 for bidirectional packet-based data communication. Such communication may be used for Internet access, private network access, VoIP, or a myriad of other bi-directional data services that may be provided via satellite gateway system 240. Access node 140-1 may include: satellite communication engine 220; steerable antenna 222;

network interface 224; and stored ephemeris data 226. Access node 140-1 may store received ephemeris data 226 using a non-transitory processor-readable medium. Stored ephemeris data 226 may be expected to remain valid for at least a predefined duration of time. For example, if access node 140-1 is deactivated for a week, stored ephemeris data 226 may be expected to still be valid. To determine whether previously stored ephemeris data is still valid, satellite communication engine 220 may compare the difference between a timestamp of stored ephemeris data and the current date and time to a stored threshold duration. If the difference is below the stored threshold, stored ephemeris data 226 may be used to attempt to acquire a communication session with a non-geosynchronous satellite of satellite constellation 121. If the difference is greater than the stored threshold, stored ephemeris data 226 may be discarded and new ephemeris data may be acquired using geosynchronous satellite 110.

Alternatively, access node 140-1 may attempt to use stored ephemeris data 226 to communicate with one or more satellites of satellite constellation 121 regardless of how out-of-date stored ephemeris data 226 is. For a defined period of time, access node 140-1 may attempt to use stored ephemeris data 226 to locate one or more satellites of satellite constellation 121. If successful, new ephemeris data may be provided via satellite constellation 121. If unsuccessful, access node 140-1 may communicate with geosynchronous satellite 110 to obtain up-to-date ephemeris data.

Satellite communication engine 220 may control how steerable antenna 222 is steered (or pointed). Steerable antenna 222 may be physically steerable, such as by using one or more motors that physically aim a dish antenna towards different parts of the sky. Alternatively, steerable antenna 222 may be a flat-panel antenna (e.g., a phased array antenna) that is electrically steerable. Satellite communication engine 220 may control the electrical properties of steerable antenna 222 to effectively point the antenna's radiation pattern in different directions. Such electric arrangements may allow for rapid aiming of steerable antenna 222.

The functions of satellite communication engine 220 may be performed by one or more underlying processors. Such one or more processors may be special-purpose processors or general-purpose processors that are configured to execute special-purpose software that causes the one or more processors to perform special-purpose functions. Once satellite communication engine 220 has established a communication session with one or more non-geosynchronous satellites of satellite constellation 121, network interface 224 may send and receive packet-based data via steerable antenna 222. Such data may be relayed by one or more of non-geosynchronous satellites 120 to satellite gateway system 240. Similarly, data addressed to access node 140-1 may be transmitted by satellite gateway system 240 to access node 140-1 via one or more non-geosynchronous satellites of non-geosynchronous satellites 120.

Non-geosynchronous satellite constellation 121 may include multiple non-geosynchronous satellites that are each on different orbital paths around the earth in LEO or MEO. For illustration purposes, only three non-geosynchronous satellites 120 (120-1, 120-2, and 120-3) are illustrated, with only detail of non-geosynchronous satellite 120-1 being illustrated.

Non-geosynchronous satellite 120-1 may include communication relay 230; antenna 232; and stored ephemeris data 234.

Antenna 232 may be an electronically-steerable antenna that can be pointed at a geographic region. The ability to communicate with access nodes may be heavily dependent on the current location of non-geosynchronous satellite 120-1 in its orbit. Data received by non-geosynchronous satellite 120-1 may be relayed from access node 140-1 to satellite gateway system 240 and from satellite gateway system 240 to access node 140-1. Communication relay 230 may serve to receive information from access node 140-1 or satellite gateway system 240 and relay to satellite gateway system 240 or access node 140-1, respectively.

In some embodiments, up-to-date stored ephemeris data 234 may be stored using a non-transitory processor-readable medium by non-geosynchronous satellite 120-1. Such ephemeris data may be occasionally or periodically transmitted to access nodes with which non-geosynchronous satellite 120-1 is communicating. Stored ephemeris data 234 may be occasionally or periodically updated by satellite gateway system 240. Therefore, if an access node, such as access node 140-1, is communicating with a non-geosynchronous satellite of satellite constellation 121, the access node will receive and store up-to-date ephemeris data. In other embodiments, rather than ephemeris data being stored at non-geosynchronous satellite 120-1, up-to-date ephemeris data may be relayed from satellite gateway system 240 to non-geosynchronous satellite 120-1 for relay to one or more access nodes (without the ephemeris data being stored for multiple transmissions at non-geosynchronous satellite 120-1). Non-geosynchronous satellites 120-2 and 120-3 may function similarly to non-geosynchronous satellite 120-1.

Satellite gateway system 240 may be a ground-based system that serves as a gateway between satellite constellation 121 and various external systems and networks, such as Internet 250 via network gateway 242. Antenna 244 may electronically or physically follow non-geosynchronous satellite 120-1 as it traverses the sky. Therefore, multiple satellite gateway systems may be needed to maintain a constant ground-to-satellite communication link. Alternatively, multiple non-geosynchronous satellites may form a mesh network such that satellite gateway system 240 does not need to directly communicate with non-geosynchronous satellite 120-1 in order to exchange information.

Ephemeris data creator 246 may determine, calculate, and/or obtain up-to-date ephemeris data. Ephemeris data determined by ephemeris data creator 246 may be stored locally by ephemeris data creator 246, may be distributed periodically by relaying through satellite constellation 121, may be transmitted to non-geosynchronous satellites 120 for storage and repeating, may be distributed periodically by relaying using geosynchronous satellite 110; and/or may be transmitted to geosynchronous satellite 110 for storage and repeating.

Figure 3:
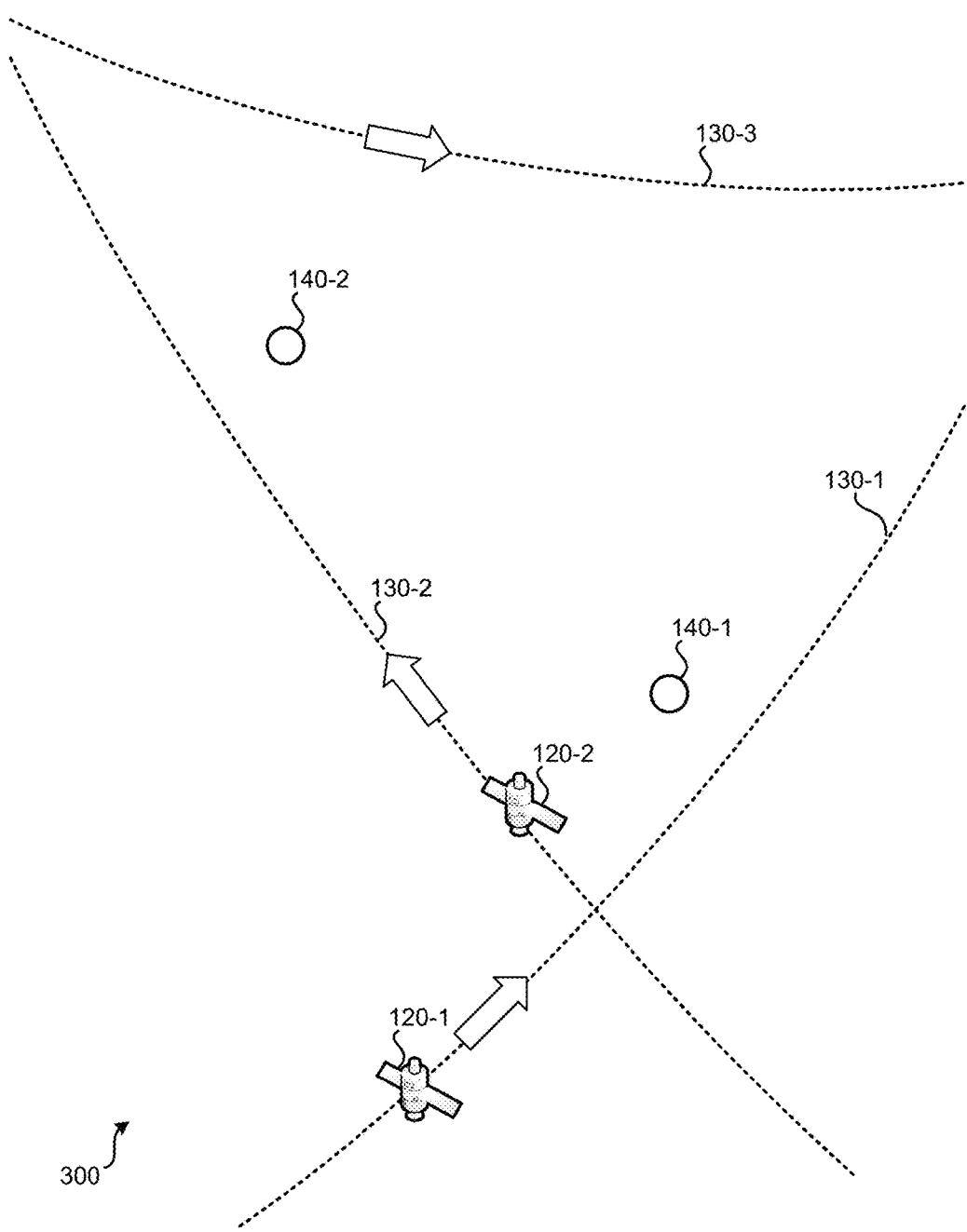
FIG. 3 illustrates a top view of a system through which an access node communicates with various non-geosynchronous satellites.

FIG. 3 illustrates a top view of a system 300 through which an access node communicates with various non-geosynchronous satellites. System 300 represents an embodiment of system 200 and/or system 100 as viewed from above. Non-geosynchronous satellites 120-1 and 120-2 have different orbits above the earth. Ephemeris data may indicate: the path of orbits 130, the direction of orbits 130 (as illustrated by the arrows), the current location of non-geosynchronous satellites 120, how to calculate the current location of non-geosynchronous satellites 120, and indications of which non-geosynchronous satellites 120 are active. Each access point of access nodes 140 may have stored data that is indicative of the current location of the access point. The ephemeris data could optionally be supplemented to include additional access information, for example, the downlink frequency and polarization (right hand/left hand), using which the access node may find the non-geosynchronous satellite. For instance, an onboard global navigation satellite system (GNSS) module may be used by each access point to determine its current location. Based on received ephemeris data and the current location of the access point, an access point may determine an accurate direction to a non-geosynchronous satellite.

As can be seen in FIG. 3, the directions from access node 140-2 and 140-1 to non-geosynchronous satellites 120 are different. Further, while access node 140-1 may currently exchange data at a high bandwidth with non-geosynchronous satellite 120-2, it may switch to communicating with non-geosynchronous satellite 120-1 as the satellites move through their orbits of the earth. Additionally, while access node 140-2 may communicate with non-geosynchronous satellite 120-2, when non-geosynchronous satellite 120-3 moves closer to access point 140-2 along orbit 130-3, access node 140-2 may additionally or alternatively communicate with non-geosynchronous satellite 120-3.

Figure 4:
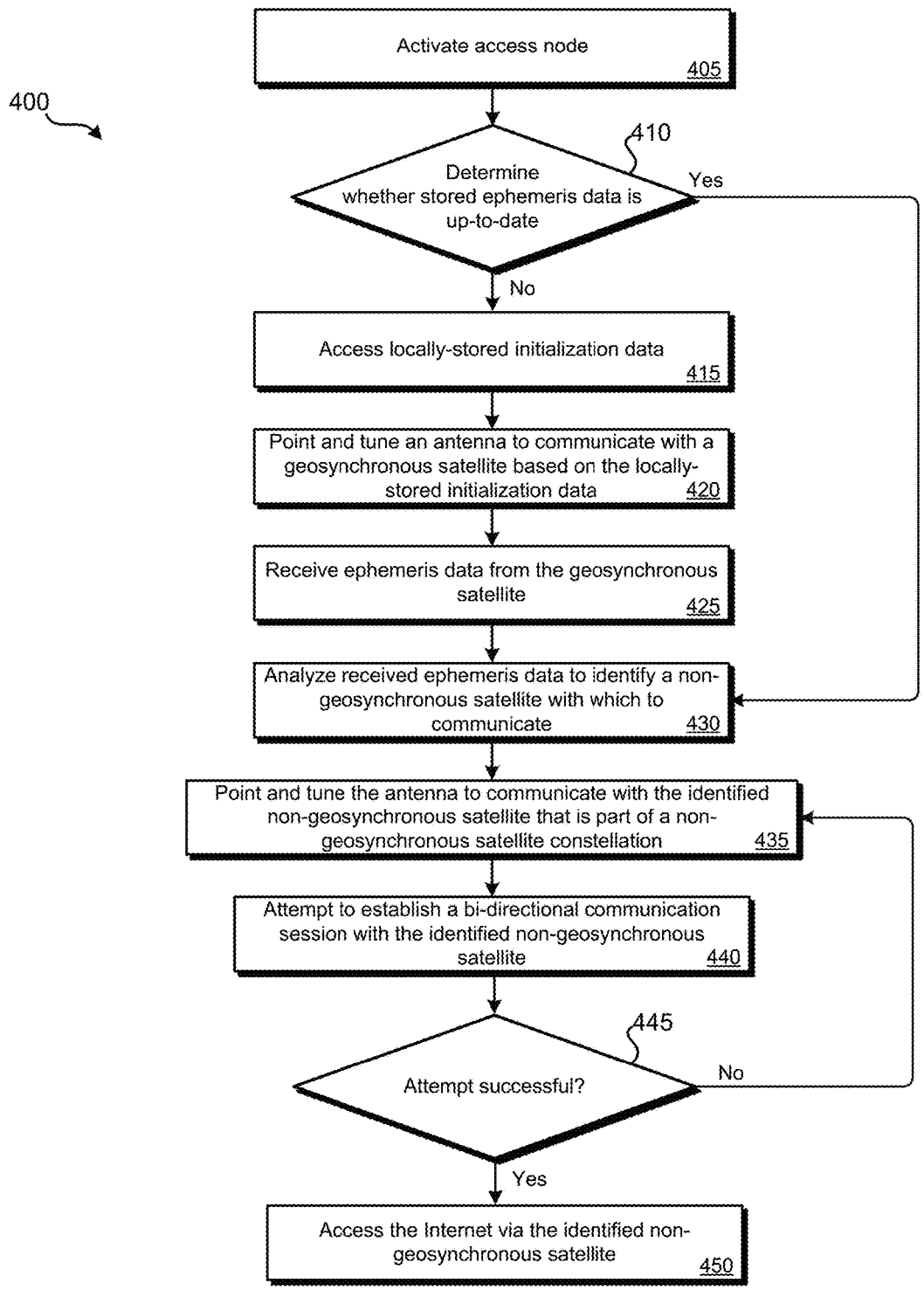
FIG. 4 illustrates an embodiment of a method for establishing a bidirectional satellite communication session.

Various methods may be performed using the systems of FIGS. 1-3. FIG. 4 illustrates an embodiment of a method 400 for establishing a bidirectional satellite communication session. Method 400 may be performed using system 100 and/or system 200. At block 405, an access node may be activated to communicate with a LEO or MEO satellite constellation (i.e., a non-geosynchronous satellite constellation). The access node may have been turned off, not-charged, disabled, in a low-power mode, or unable to communicate with satellites (e.g., due to interference, weather-based attenuation) for a period of time. This period of time may have been substantial, such as minutes, hours, days, weeks, months, or even years.

At block 410, once the access node has been activated, the access node may determine whether ephemeris data it has stored is up-to-date. Determining whether stored ephemeris data is up-to-date may include determining a time difference between a timestamp of the ephemeris data and a current time. This difference may then be compared to a threshold ephemeris time value stored or otherwise accessible by the access node. If the difference exceeds the threshold ephemeris time value, method 400 may proceed to block 415. If the difference value does not exceed the threshold ephemeris time value, method 400 may proceed to block 430.

In other embodiments, rather than evaluating how old the stored ephemeris data is, the ephemeris data may be tested. That is, the stored ephemeris data may be used to attempt to communicate with one or more non-geosynchronous satellites of the satellite constellation at block 430. If the ephemeris data is sufficiently correct and the access node is able to acquire a communication session with a satellite of the non-geosynchronous satellite constellation using the ephemeris data at block 440, up-to-date ephemeris data may be acquired via the non-geosynchronous satellite constellation (which may not have changed from the stored ephemeris data). If, after a defined period of time, it is determined that the stored ephemeris data is inaccurate enough that no communication link can be established with a satellite of the non-geosynchronous satellite constellation, method 400 may continue to block 415.

Whether the stored ephemeris data is determined to be out of date or inaccurate, method 400 may proceed to block 415 at which locally stored initialization data may be accessed by the access node. The stored initialization data may include an indication of an orbital location (and, possibly, frequency, carrier sizes, and/or carrier types, etc.) of a geosynchronous satellite from which up-to-date ephemeris data can be obtained.

At block 420, the access node may be able to calculate a direction from the access node to the geosynchronous satellite using the stored location of the geosynchronous satellite and a location of the access node. In some embodiments, the location of the access node may be obtained from a GNSS module that determines global coordinates using GPS, BeiDou, GLONASS, or Galileo or some other source. The geosynchronous satellite may be expected to remain in a near-constant location for a long period of time. Therefore, even if the ephemeris data for the non-geosynchronous satellite constellation is significantly out of date, the access node may be able to quickly determine the direction to the geosynchronous satellite. Using the calculated direction to the geosynchronous satellite, the access point may point an antenna to communicate with the geosynchronous satellite based on the locally stored initialization data, and, possibly, the determined location of the access node. In some embodiments, rather than using data from a GNSS module, a previously-stored indication of location of the access node may be available for retrieval.

In the embodiment of method 400, communication with the geosynchronous satellite is unidirectional. That is, no data needs to be transmitted by the access node to the geosynchronous satellite in order to obtain ephemeris data. Rather, the geosynchronous satellite periodically transmits up-to-date ephemeris data for the non-geosynchronous satellite constellation at block 425. Additionally, at block 425, this up-to-date ephemeris data may be received by the access node from the geosynchronous satellite.

At block 430, the received ephemeris data may be analyzed to identify one or more non-geosynchronous satellites with which the access node can attempt to communicate. The received ephemeris data may be analyzed in conjunction with a location of the access node, such as a location obtained from a GNSS module. The ephemeris data may be analyzed in conjunction with the location of the access node to determine a closest satellite of the non-geosynchronous satellite constellation. This satellite may be the first satellite with which the access node attempts to communicate. Communication with satellites further away may be attempted if communication with the first satellite is unsuccessful. The ephemeris data may include indications of frequency, carrier sizes, and/or carrier types, etc. of the non-geosynchronous satellites.

At block 435, the antenna of the access node may be pointed in an appropriate direction and tuned to the appropriate frequency based on the ephemeris data and the determined location of the access node to communicate with the non-geosynchronous satellite identified at block 430. The antenna may be pointed mechanically or electrically.

At block 440, once the antenna has been pointed and tuned to communicate with the identified non-geosynchronous satellite, a bidirectional communication session established between the identified non-geosynchronous satellite and the access node may be attempted. At block 445, the access node determines if a bidirectional communication session has been properly established. If, for some reason, the communication session cannot be established, such as due to interference, method 400 may return to block 435 and the ephemeris data may again be used to identify a non-geosynchronous satellite from the non-geosynchronous satellite constellation with which an attempt is made to communicate. At block 445, if the access node determines that the attempt to establish a bidirectional communication session is successful, method 400 may proceed to block 450.

At block 450, packet data may be transmitted to the access node and from the access node via one or more of the non-geosynchronous satellites. Data may be routed through a ground-based satellite gateway system which allows communication between the access node and one or more external networks or systems, such as the Internet. Other services are possible, such as VoIP.

Figure 5:
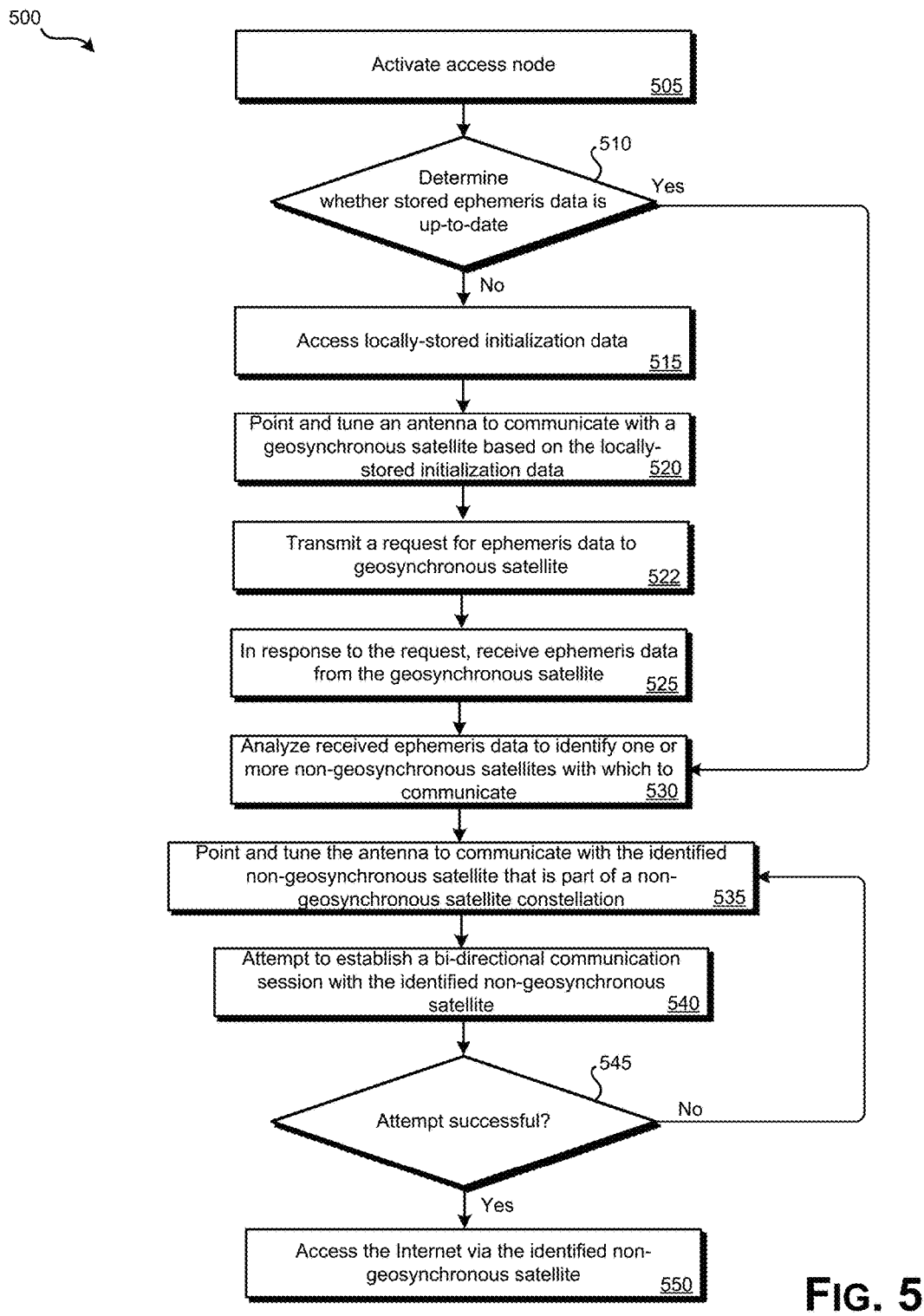
FIG. 5 illustrates another embodiment of a method for establishing a bidirectional satellite communication session.

FIG. 5 illustrates an embodiment of a method 500 for establishing a bidirectional satellite communication session. While in method 400 the geosynchronous satellite multicasts ephemeris data, in method 500, the access node requests ephemeris data. Method 500 may be performed using system 100 and/or system 200. At block 505, an access node may be activated to communicate using a LEO or MEO satellite constellation (i.e., a non-geosynchronous satellite constellation). The access node may have been turned off, not-charged, disabled, in a low-power mode, or unable to communicate with satellites (e.g., due to interference) for a period of time. This period of time may have been substantial, such as minutes, hours, days, weeks, months, or even years.

At block 510, once the access node has been activated, the access node may determine whether ephemeris data it has stored is up-to-date. Determining whether stored ephemeris data is up-to-date may include determining a time difference between a timestamp of the ephemeris data and a current time. This difference may then be compared to a threshold ephemeris time value stored or otherwise accessible by the access node. If the difference exceeds the threshold ephemeris time value, method 500 may proceed to block 515. If the difference value does not exceed the threshold ephemeris time value, method 500 may proceed to block 530.

In other embodiments, rather than evaluating how old the stored ephemeris data is, the ephemeris data may be tested. That is, the stored ephemeris data may be used to attempt to communicate with one or more non-geosynchronous satellites of the satellite constellation at block 530. If the ephemeris data is sufficiently correct and the access node is able to acquire a communication session with a satellite of the non-geosynchronous satellite constellation using the ephemeris data at block 540, up-to-date ephemeris data may be acquired via the non-geosynchronous satellite constellation (which may not have changed from the stored ephemeris data). If, after a defined period of time, it is determined that the stored ephemeris data is inaccurate enough that no communication link can be established with a satellite of the non-geosynchronous satellite constellation, method 500 may continue to block 515.

Whether the stored ephemeris data is determined to be out of date or inaccurate, method 500 may proceed to block 515 at which locally stored initialization data may be accessed by the access node. The stored initialization data may include an indication of an orbital location (and, possibly, frequency) of a geosynchronous satellite from which up-to-date ephemeris data can be obtained.

At block 520, the access node may be able to calculate a direction from the access node to the geosynchronous satellite using the stored location of the geosynchronous satellite and a location of the access node. In some embodiments, the location of the access node, which may be obtained from a GNSS module that determines global coordinates using GPS, BeiDou, GLONASS, or Galileo or some other source. The geosynchronous satellite may be expected to remain in a near-constant location for a long period of time. Therefore, even if the ephemeris data for the non-geosynchronous satellite constellation is significantly out of date, the access node may be able to quickly determine the direction to the geosynchronous satellite. Using the calculated direction to the geosynchronous satellite, the access point may point an antenna to communicate with the geosynchronous satellite based on the locally stored initialization data, and possibly, the determined location of the access node.

In the embodiment of method 500, communication with the geosynchronous satellite is bidirectional. At block 522, a request for ephemeris data may be transmitted to the geosynchronous satellite. In some embodiments, the geosynchronous satellite may respond to the request directly at block 525 by transmitting stored up-to-date ephemeris data. In other embodiments, the request may be relayed to a satellite gateway system for evaluation and determination as to whether ephemeris data is to be provided in response. If ephemeris data is to be provided, the up-to-date ephemeris data may be relayed to the access node via the geosynchronous satellite at block 525. At block 525, regardless of whether the up-to-date ephemeris data is provided directly by the geosynchronous satellite or is relayed by the geosynchronous satellite, the ephemeris data may be received by the access node.

At block 530, the received ephemeris data may be analyzed to identify one or more non-geosynchronous satellites with which the access node can attempt to communicate. The received ephemeris data may be analyzed in conjunction with a location of the access node, such as a location obtained from a GNSS module. The ephemeris data may be analyzed in conjunction with the location of the access node to determine a closest satellite of the non-geosynchronous satellite constellation. This satellite may be the first satellite with which the access node attempts to communicate. Attempts to communicate with satellites further away may be made if communication with the first satellite is unsuccessful.

At block 535, the antenna of the access node may be pointed in an appropriate direction and tuned to the appropriate frequency based on the ephemeris data and the determined location of the access node to communicate with the non-geosynchronous satellite identified at block 530. The antenna may be pointed mechanically or electrically.

At block 540, once the antenna has been pointed and tuned to communicate with the identified non-geosynchronous satellite, a bidirectional communication session established between the identified non-geosynchronous satellite and the access node may be attempted. At block 545, the access node determines if a bidirectional communication session has been properly established. If, for some reason, the communication session cannot be established, such as due to interference, method 500 may return to block 535 and the ephemeris data may again be used to identify a non-geosynchronous satellite from the non-geosynchronous satellite constellation with which an attempt is made to communicate. At block 545, if the access node determines that the attempt to establish a bidirectional communication session is successful, method 500 may proceed to block 550.

At block 550, packet data may be transmitted to the access node and from the access node via the non-geosynchronous satellite. Data may be routed through a ground-based satellite gateway system which allows communication between the access node and one or more external networks or systems, such as the Internet. Other possible services are possible, such as VoIP.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for establishing a bidirectional satellite communication session, the method comprising:
   accessing, by an access node, initialization data to tune an antenna to a geosynchronous satellite, wherein the initialization data is stored locally by the access node;
   using, by the access node, the initialization data to point and tune the antenna to the geosynchronous satellite;
   receiving, by the access node, ephemeris data from the geosynchronous satellite, wherein the ephemeris data is indicative of orbital locations of satellites that are part of a non-geosynchronous satellite constellation;
   using, by the access node, the ephemeris data from the geosynchronous satellite to point and tune the antenna to a satellite of the non-geosynchronous satellite constellation; and
   establishing, by the access node, the bidirectional satellite communication session with the satellite of the non-geosynchronous satellite constellation.

2. The method for establishing the bidirectional satellite communication session of claim 1, further comprising:
   accessing, by the access node, a communication network via the satellite of the non-geosynchronous satellite constellation with which the bidirectional satellite communication session has been established.

3. The method for establishing the bidirectional satellite communication session of claim 1, further comprising:
   broadcasting, by the geosynchronous satellite, the ephemeris data on a periodic basis as multicast data.

4. The method for establishing the bidirectional satellite communication session of claim 1, further comprising:
   transmitting, by the access node, a request for ephemeris data to the geosynchronous satellite via the antenna that has been pointed and tuned to the geosynchronous satellite.

5. The method for establishing the bidirectional satellite communication session of claim 4, further comprising:
   transmitting, by the geosynchronous satellite, the ephemeris data to the access node in response to the request.

6. The method for establishing the bidirectional satellite communication session of claim 1, wherein the antenna of the access node is a flat panel antenna and is electronically pointed.

7. The method for establishing the bidirectional satellite communication session of claim 1, wherein the non-geosynchronous satellite constellation is a low earth orbit (LEO) satellite constellation.

8. The method for establishing the bidirectional satellite communication session of claim 1, wherein the non-geosynchronous satellite constellation is a medium earth orbit (MEO) satellite constellation.

9. The method for establishing the bidirectional satellite communication session of claim 1, wherein the non-geosynchronous satellite constellation is an eccentric earth orbit satellite constellation.

10. The method for establishing the bidirectional satellite communication session of claim 1, wherein the non-geosynchronous satellite constellation is a hybrid satellite constellation that includes one or more non-geosynchronous satellites in LEO and one or more non-geosynchronous satellites in MEO.

11. The method for establishing the bidirectional satellite communication session of claim 1, further comprising:
    determining, by the access node, that locally-stored ephemeris data is no longer valid, wherein the initialization data is accessed in response to determining that the locally-stored ephemeris is no longer valid.

12. The method for establishing the bidirectional satellite communication session of claim 11, wherein determining that the locally-stored ephemeris data is no longer valid comprises:
    determining a time difference that has elapsed between a current time and a timestamp of the locally-stored ephemeris data; and
    determining that the time difference exceeds an ephemeris data validity time threshold.

13. The method for establishing the bidirectional satellite communication session of claim 1, further comprising:
    determining, by the access node, that locally-stored ephemeris data cannot be used to successfully communicate with the non-geosynchronous satellite constellation, wherein the initialization data is accessed in response to determining that the locally-stored ephemeris data cannot be used to successfully communicate with the non-geosynchronous satellite constellation.

14. The method for establishing the bidirectional satellite communication session of claim 1, wherein the ephemeris data includes one or more items selected from the group consisting of: frequency, carrier sizes, carrier types.

15. A system for establishing a bidirectional satellite communication session, the system comprising:
an access node, comprising:
a steerable antenna;
a network interface;
one or more processors in communication with the network interface and the steerable antenna, wherein the one or more processors are configured to:
access initialization data to tune an antenna to a geosynchronous satellite, wherein the initialization data is stored locally by the access node;
use the initialization data to point and tune the antenna to the geosynchronous satellite;
receive ephemeris data from the geosynchronous satellite, wherein the ephemeris data is indicative of orbital locations of satellites that are part of a non-geosynchronous satellite constellation;
use the ephemeris data from the geosynchronous satellite to point and tune the antenna to a satellite of the non-geosynchronous satellite constellation; and
establish the bidirectional satellite communication session with the satellite of the non-geosynchronous satellite constellation.

16. The system for establishing the bidirectional satellite communication session of claim 15, wherein the one or more processors are further configured to:
access a communication network via the satellite of the non-geosynchronous satellite constellation with which the bidirectional satellite communication session has been established.

17. The system for establishing the bidirectional satellite communication session of claim 15, the system further comprising the geosynchronous satellite that is configured to broadcast the ephemeris data on a periodic basis as multicast data.

18. The system for establishing the bidirectional satellite communication session of claim 15, wherein the one or more processors are further configured to:
transmit a request for ephemeris data to the geosynchronous satellite via the steerable antenna that has been pointed and tuned to the geosynchronous satellite.

19. The system for establishing the bidirectional satellite communication session of claim 18, the system further comprising the geosynchronous satellite that is configured to transmit the ephemeris data to the access node in response to the request.

20. The system for establishing the bidirectional satellite communication session of claim 15, wherein the steerable antenna of the access node is a flat panel antenna and is electronically pointed.

* * * * *